No. 832,111. PATENTED OCT. 2, 1906.
M. E. WOODS.
DISTRIBUTING DEVICE FOR OILERS.
APPLICATION FILED JAN. 22, 1906.
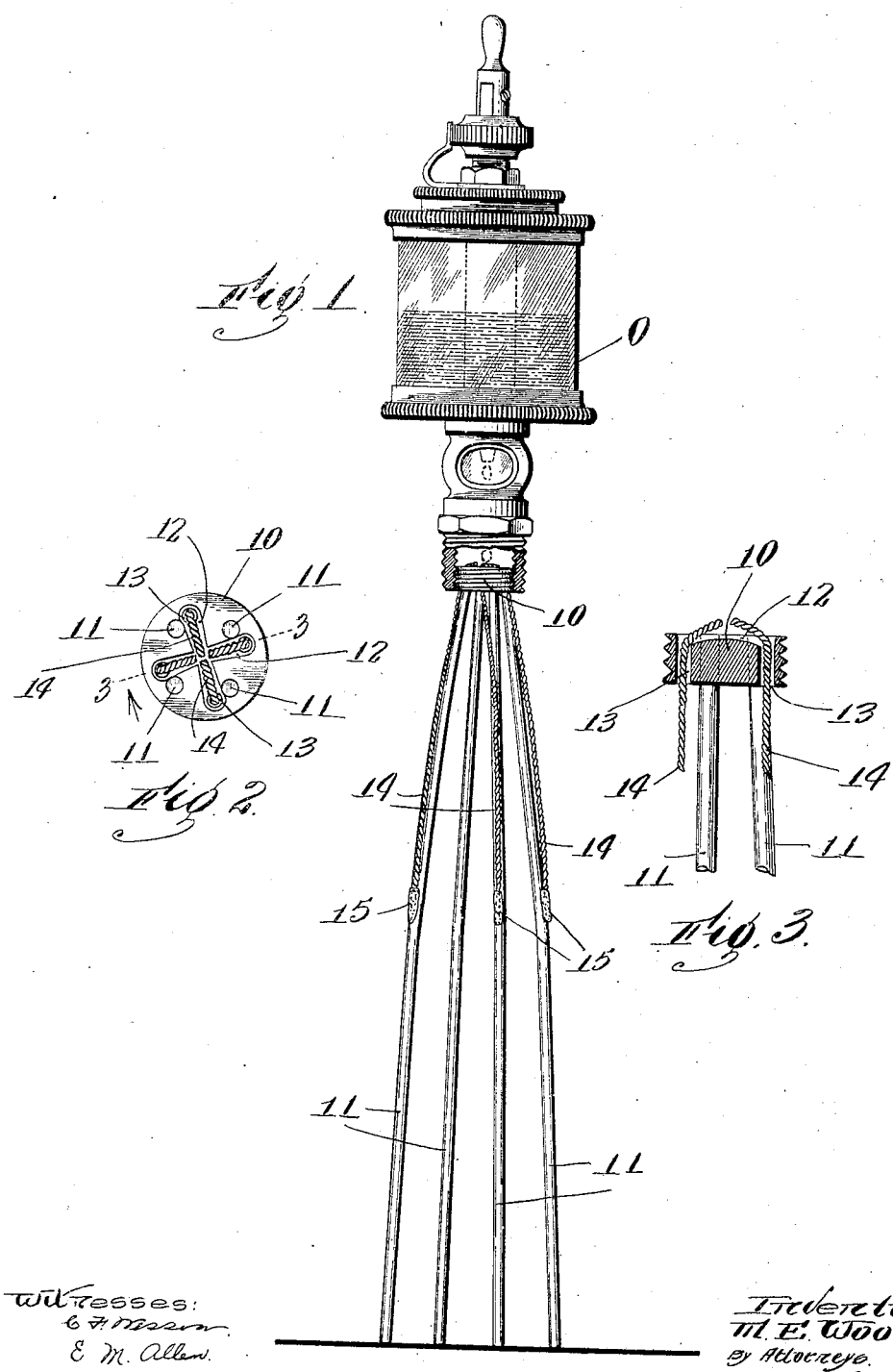

UNITED STATES PATENT OFFICE.

MARSHALL E. WOODS, OF WOODVILLE, MASSACHUSETTS.

DISTRIBUTING DEVICE FOR OILERS.

No. 832,111.  Specification of Letters Patent.  Patented Oct. 2, 1906.

Application filed January 22, 1906. Serial No. 297,111.

*To all whom it may concern:*

Be it known that I, MARSHALL E. WOODS, a citizen of the United States, residing at Woodville, in the county of Middlesex and State of Massachusetts, have invented a new and useful Distributing Device for Oilers, of which the following is a specification.

In many classes of machines it is desirable to oil a number of bearings or moving parts and to supply an equal amount of oil to each bearing or part. This is usually done by an oil or feed cup or oil-supplying mechanism to each bearing or part and by adjusting each oil-supplying mechanism so that the flow to each bearing or place will be equalized as nearly as possible. This usual method necessitates the use of an oil-supplying device or cup for each bearing, and, moreover, does not always give an equal supply to each bearing, because the adjustments may not be made correctly.

To meet the above requirements, I have provided an improved attachment or oil-separating device which may be used in connection with a single oil-cup or source of oil-supply, which attachment will divide the supply of oil into as many equal parts as desired, and which will conduct the divided parts of the oil to the proper locations. By this arrangement by adjusting the oil-supply or oil-cup to supply enough oil for the plurality of bearings which it is desired to lubricate provision is made for the proper and even oiling thereof.

The device hereinafter described is also well adapted for oiling bearings or parts that are hard to get at.

The device has been used to advantage in oiling the valve-bearings of engines and may be used, of course, for other purposes.

The device consists of a distributer having a separate wire or conducting device leading from the distributer to each bearing and an oil-separating device consisting, preferably, of a wire spring or screws leading to each conducting device, the points of each screw being set in position so that each drop of oil as it is fed from the oil-supplying device will fall upon the point of each screw or wire spring. By this arrangement each drop of oil will be divided and conducted by the screw or spring out on the conducting-wires, and thus distributed evenly to the various bearings.

The invention is illustrated in the accompanying drawings, in which—

Figure 1 is a side elevation, partly in section, of an oil-cup with my invention applied thereto. Fig. 2 is a plan view, on an enlarged scale, of the distributing device; and Fig. 3 is a sectional view taken on the line 3 3 of Fig. 2.

Referring to the drawings and in detail, O designates an oil-cup or oil-supplying device of any desired character, from which an oil-supply can be obtained. As illustrated, the same consists of an ordinary oil-cup having an adjustable sight-feed. My improved distributer is connected to the bottom of the same.

The distributer consists of a plug 10, which is screwed in the bottom of the oil-cup. Secured in the plug 10 are as many conducting devices or wires 11 as there are bearings or parts to be oiled, four being shown in the present illustration. The top of the plug 10 is preferably notched or grooved out from the center, as at 12, in as many directions as there are conductors, and a hole 13 is bored through the plug 10 at the end of each slot. A wire 14, which is preferably made in the form of a screw or spring, is soldered to each leg or wire at 15, and the end of each screw or wire spring is passed up through one of the holes 13, and the ends of the wire springs are bent to come as accurately as possible to the center of the bushing 10.

In operation as a drop of oil comes down from the oil-supplying device it will strike on the ends of these wire springs or screws 14 and will be caught thereon and in the groove 12. Owing to the twist of the wire springs or screws the drop of oil will be momentarily held at this position and by gravity will be divided out on the wire springs or screws, the pitch or twist of the wire substantially holding the drop of oil back or making a long path for the same, so that the drop of oil will be divided into substantially equal portions. Each portion therefore will pass down one of the wire springs or screws onto a leg 11 and will run down the same to the bearing which it is desired to lubricate. Thus by this arrangement all that is necessary to get the right supply of oil is to adjust the oil-cup to supply the necessary amount of oil for the plurality of bearings and the supply of oil will be equally distributed among the bearings. Economy and efficiency in operation are obtained, because by dividing each drop of oil in this way a supply is given to each bearing much oftener than would be the case if a single drop was applied at a time to each bearing and because one oil-cup can be adjusted more quickly and accurately than a plurality.

The invention can be applied as above stated, so that inaccessible parts hard to reach can be oiled, because the wires 11 can be bent and twisted around to reach the parts.

The details and arrangements herein shown and described may be greatly varied by a skilled mechanic without departing from the scope of my invention as expressed in the claims.

Having thus fully described my invention, what I claim, and desire to secure by Letters Patent, is—

1. A device for the purpose described, comprising a plug, a conductor connected therewith, and a wire spring connected with the conductor and extending through the plug, said plug having a perforation for receiving the wire spring.

2. The combination of an oil-supplying device for supplying drops of oil, a plurality of conductors connected thereto, and an oil-distributing device for dividing the drops of oil among the conductors comprising a screw or spring connected to each conductor.

3. A device for the purpose stated, comprising a plug, a plurality of conductors connected thereto, and a wire spring connected to each conductor and extending up through the plug.

4. A device for the purpose described, comprising a plug, a plurality of conductors secured thereto, a number of holes being bored in said plug, and a wire spring connected to each conductor and extending up through one of said holes, the ends of said springs being led to a point substantially at the center of the plug.

5. A device for the purpose described, comprising a plug, a plurality of conducting-wires attached thereto, holes being bored through the plug for supplying each conducting-wire with oil, and a wire spring or screw extending up through one of said holes, the ends of said springs or screws being led to substantially the center of the plug.

6. A device for the purpose described, comprising a plug, a plurality of conducting-wires connected thereto, there being a hole through the plug for each conducting-wire, and a groove extending from the center of the plug to each hole, and a wire spring or screw attached to each conducting-wire extending up through one of said holes, the ends of said springs or screws being led substantially to the center of the plug.

In testimony whereof I have hereunto set my hand in the presence of two subscribing witnesses.

MARSHALL E. WOODS.

Witnesses:
LOUIS W. SOUTHGATE,
MARY E. REGAN.